US012095126B2

(12) United States Patent
Mitsuta (10) Patent No.: US 12,095,126 B2
(45) Date of Patent: Sep. 17, 2024

(54) METHOD OF CONTROLLING HYDROGEN/OXYGEN PRODUCING SYSTEM AND HYDROGEN/OXYGEN PRODUCING SYSTEM

(71) Applicant: HONDA MOTOR CO., LTD., Tokyo (JP)

(72) Inventor: Naoki Mitsuta, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 539 days.

(21) Appl. No.: 17/529,307

(22) Filed: Nov. 18, 2021

(65) Prior Publication Data

US 2022/0166041 A1 May 26, 2022

(30) Foreign Application Priority Data

Nov. 24, 2020 (JP) ................................. 2020-194357

(51) Int. Cl.
*C25B 1/04* (2021.01)
*B01D 53/32* (2006.01)
(Continued)

(52) U.S. Cl.
CPC .......... *H01M 8/04895* (2013.01); *C25B 1/04* (2013.01); *C25B 9/05* (2021.01); *C25B 15/02* (2013.01);
(Continued)

(58) Field of Classification Search
CPC ......... C25B 1/04; C25B 15/02; C25B 15/023; C25B 9/05; C25B 9/70; C25B 9/23; B01D 53/326
See application file for complete search history.

(56) References Cited

U.S. PATENT DOCUMENTS 8,721,867 B2 * 5/2014 Taruya ...................... C25B 1/04
 205/628
11,214,880 B2 * 1/2022 Kurashina ................. C25B 9/19
(Continued)

FOREIGN PATENT DOCUMENTS

CN      101818357      9/2010
CN      110528012      12/2019
(Continued)

OTHER PUBLICATIONS

Chinese Office Action for Chinese Patent Application No. 202111358378.5 mailed Jul. 10, 2023.
(Continued)

*Primary Examiner* — Brian W Cohen
(74) *Attorney, Agent, or Firm* — Amin, Turocy & Watson, LLP (57) ABSTRACT

A method of controlling a hydrogen/oxygen producing system is a method of controlling a hydrogen/oxygen producing system including a water electrolysis apparatus that electrolyzes liquid water by applying current to an anode and a cathode, and a hydrogen gas pressurizing part that pressurizes hydrogen at downstream of the water electrolysis apparatus by applying current to a pressurizing part anode and a pressurizing part cathode. A controller controls current applied to the water electrolysis apparatus and current applied to the hydrogen gas pressurizing part. When the hydrogen/oxygen producing system is stopped, the controller performs first decompression processing such that a decompression speed of the pressurizing part cathode of the hydrogen gas pressurizing part does not exceed a basic decompression speed and performs second decompression processing such that a decompression speed of the anode of the water electrolysis apparatus does not exceed the decompression speed of the pressurizing part cathode.

7 Claims, 3 Drawing Sheets

(51) Int. Cl.
    *C25B 9/05*     (2021.01)
    *C25B 15/02*     (2021.01)
    *H01M 8/04082*     (2016.01)
    *H01M 8/04119*     (2016.01)
    *H01M 8/04746*     (2016.01)
    *H01M 8/04828*     (2016.01)
    *H01M 8/04858*     (2016.01)
    *H01M 8/0656*     (2016.01)
    *H01M 16/00*     (2006.01)
    *H01M 8/10*     (2016.01)

(52) U.S. Cl.
    CPC ... *H01M 8/04119* (2013.01); *H01M 8/04201* (2013.01); *H01M 8/04753* (2013.01); *H01M 8/04835* (2013.01); *H01M 16/003* (2013.01); *B01D 53/326* (2013.01); *H01M 8/0656* (2013.01); *H01M 2008/1095* (2013.01); *H01M 2250/20* (2013.01)

(56) References Cited

U.S. PATENT DOCUMENTS

| | | |
|---|---|---|
| 2010/0213051 A1 | 8/2010 | Ishikawa et al. |
| 2015/0030952 A1* | 1/2015 | Blanchet ................ C25B 1/04 |
| | | 429/446 |
| 2015/0060293 A1* | 3/2015 | Takeuchi ................ C25B 9/05 |
| | | 205/338 |
| 2019/0276944 A1 | 9/2019 | Yakumaru et al. |
| 2019/0311890 A1 | 10/2019 | Yakumaru et al. |
| 2019/0363386 A1 | 11/2019 | Wakita et al. |

FOREIGN PATENT DOCUMENTS

| | | |
|---|---|---|
| DE | 102019217219 | 5/2021 |
| JP | 2005-180545 | 7/2005 |
| JP | 2006-131942 | 5/2006 |
| JP | 2007-165263 | 6/2007 |
| JP | 2011-208260 | 10/2011 |
| JP | 2012-036473 | 2/2012 |
| JP | 2012-219291 | 11/2012 |
| JP | 2013-060625 | 4/2013 |
| JP | 2015-048507 | 3/2015 |
| JP | 2015-209576 | 11/2015 |
| JP | 2016-537508 | 12/2016 |
| JP | 2017-210665 | 11/2017 |
| JP | 2022-029892 | 2/2022 |

OTHER PUBLICATIONS

Japanese Notice of Allowance for Japanese Application No. 2020-194357 dated Jul. 5, 2022.
German Search Report for German Application No. 102021129872.5 dated Jul. 11, 2022.

* cited by examiner

METHOD OF CONTROLLING HYDROGEN/OXYGEN PRODUCING SYSTEM AND HYDROGEN/OXYGEN PRODUCING SYSTEM

CROSS-REFERENCE TO RELATED APPLICATION

Priority is claimed on Japanese Patent Application No. 2020-194357, filed Nov. 24, 2020, the content of which is incorporated herein by reference.

BACKGROUND OF THE INVENTION

Field of the Invention

The present invention relates to a method of controlling a hydrogen/oxygen producing system and a hydrogen/oxygen producing system.

Description of Related Art

In general, in a power generation reaction of a fuel cell mounted on a fuel cell vehicle or the like, hydrogen gas is used as a fuel gas, and oxygen is required as an oxidation gas. The hydrogen and oxygen gas can be produced by a hydrogen/oxygen producing system including a water electrolysis apparatus. In the hydrogen/oxygen producing system, by electrolyzing water with the water electrolysis apparatus, hydrogen gas is generated on a cathode of the water electrolysis apparatus and oxygen gas is generated on an anode of the water electrolysis apparatus.

As one type of the water electrolysis apparatus, there is a solid polymer type water electrolysis apparatus having an electrolyte membrane (an ion exchange membrane), and an anode and a cathode isolated from each other with the electrolyte membrane being interposed therebetween. For example, in a solid polymer type water electrolysis apparatus, liquid water supplied to the anode is electrolyzed to generate oxygen gas at the anode, and hydrogen ions generated at the anode pass through the electrolyte membrane to generate hydrogen gas at the cathode. In the solid polymer type water electrolysis apparatus, a so-called crossover in which the generated oxygen gas and hydrogen gas pass through the electrolyte membrane can occur. When a crossover amount is large, a decrease in purity due to mixing of gases, deterioration of the electrolyte membrane, or the like may occur. In particular, when a method of simultaneously boosting the gases generated upon water electrolysis is adopted, the crossover amount increases due to the high pressure, and a mixing ratio of the gases increases. Here, in the hydrogen/oxygen producing system using the solid polymer type water electrolysis apparatus, in general, by maintaining one of the oxygen gas and the hydrogen gas at a higher pressure than the other, it is possible to prevent occurrence of at least the crossover from the other. Accordingly, by defining a side where the mixed gas is generated, providing an additional device configured to perform management of an operating state or dilution, and the like, it is possible to prevent a gas mixing concentration from exceeding a predetermined level and to prevent sudden gas mixing from occurring. In this case, the generated oxygen gas or hydrogen gas is discharged toward a tank, an exhaust pressure valve, or the like downstream from the water electrolysis apparatus.

As the hydrogen/oxygen producing system including the water electrolysis apparatus, for example, there is a system disclosed in Japanese Unexamined Patent Application, First Publication No. 2017-210665. The system includes a differential pressure type high pressure water electrolysis apparatus configured to generate oxygen at a side of an anode and hydrogen with a higher pressure than the oxygen at a side of a cathode, and decompression processing at the side of the cathode is performed while a decompression current is applied upon stoppage of the system. Accordingly, a rapid decrease in pressure can be minimized, and destruction of members such as the electrolyte membrane or the like due to hydrogen expansion can be minimized.

Incidentally, since the oxygen gas has a molecular weight that is greater than that of the hydrogen gas, the oxygen is less permeable to the electrolyte membrane than the hydrogen gas. For this reason, in the solid polymer type water electrolysis apparatus, the durability is improved because the gas mixing concentration generated by the crossover becomes lower when the oxygen gas is maintained at a higher pressure than the hydrogen gas compared to a case in which the hydrogen gas is pressurized with high pressure.

In the system configured to pressurize the oxygen and hydrogen to reach a high pressure together, a hydrogen/oxygen producing system that maintains oxygen gas at a higher pressure than hydrogen gas is advantageous in terms of durability. In this case, the hydrogen that was not pressurized at the same timing with the water electrolysis needs to be pressurized separately. As an example of a means configured to pressurize hydrogen gas, there is an electrochemical hydrogen pressurizing apparatus capable of minimizing an increase in size of a system compared to a compressor. The electrochemical hydrogen pressurizing apparatus has an ion exchange membrane (a proton exchange membrane), an anode and a cathode isolated from each other with the ion exchange membrane interposed therebetween, and a power supply configured to apply a voltage to the anode and the cathode. Under voltage application by the power supply, the electrochemical hydrogen pressurizing apparatus ionizes hydrogen gas supplied to an anode, allows hydrogen ions conduction to the ion exchange membrane, and returns the hydrogen ions to the hydrogen gas by reaching the cathode. By moving the hydrogen ions from the anode to the cathode in this way, it becomes possible to generate the pressurized hydrogen gas on the cathode. For this reason, according to the electrochemical hydrogen pressurizing apparatus, it is possible to discharge the hydrogen gas with a higher pressure than the hydrogen gas supplied to the anode from the cathode.

SUMMARY OF THE INVENTION

However, even in the electrochemical hydrogen pressurizing apparatus, crossover can occur as in the solid polymer type water electrolysis apparatus. For this reason, when the hydrogen/oxygen producing system having the solid polymer type water electrolysis apparatus and the electrochemical hydrogen pressurizing apparatus is stopped, if the decompression processing of the hydrogen pressurizing apparatus is not also properly controlled in addition to the decompression processing of the water electrolysis apparatus, the high pressure hydrogen gas may flow into the water electrolysis apparatus from a downstream side of hydrogen pressurizing apparatus due to the crossover in the hydrogen pressurizing apparatus, and the crossover of the hydrogen gas in the water electrolysis apparatus may occur. In addition, in the electrochemical hydrogen pressurizing apparatus, membrane breakage may occur due to moisture vaporization in the ion exchange membrane caused by rapid decompression.

Accordingly, in the hydrogen/oxygen producing system including the electrochemical hydrogen pressurizing apparatus, development of an appropriate method of controlling when the system is stopped is desired.

An aspect of the present invention is directed to providing a method of controlling a hydrogen/oxygen producing system and a hydrogen/oxygen producing system capable of appropriately decompressing a water electrolysis apparatus and an electrochemical hydrogen pressurizing apparatus when the system is stopped.

A method of controlling a hydrogen/oxygen producing system of the present invention is a method of controlling a hydrogen/oxygen producing system, the hydrogen/oxygen producing system including: a water electrolysis apparatus configured to electrolyze liquid water by applying a current to an anode and a cathode provided on both surfaces of an electrolyte membrane, generate hydrogen at the cathode, and generate oxygen at the anode with a higher pressure than that of the hydrogen; a supply part configured to supply the liquid water to the water electrolysis apparatus; an electrochemical hydrogen pressurizing apparatus configured to pressurize the hydrogen at a downstream of the water electrolysis apparatus by applying a current to a pressurizing part anode and a pressurizing part cathode provided on both surfaces of an electrolyte membrane; and a controller configured to control a current applied to the water electrolysis apparatus and a current applied to the electrochemical hydrogen pressurizing apparatus, wherein the method of controlling a hydrogen/oxygen producing system includes, when the hydrogen/oxygen producing system is stopped, controlling the controller to perform a first decompression processing such that a decompression speed of the pressurizing part cathode of the electrochemical hydrogen pressurizing apparatus does not exceed a basic decompression speed, and to perform a second decompression processing such that a decompression speed of the anode of the water electrolysis apparatus does not exceed the decompression speed of the pressurizing part cathode of the electrochemical hydrogen pressurizing apparatus.

A hydrogen/oxygen producing system of the present invention includes a water electrolysis apparatus configured to electrolyze liquid water by applying a current to an anode and a cathode provided on both surfaces of an electrolyte membrane, generate hydrogen at the cathode, and generate oxygen at the anode with a higher pressure than that of the hydrogen; a supply part configured to supply the liquid water to the water electrolysis apparatus; an electrochemical hydrogen pressurizing apparatus configured to pressurize the hydrogen at a downstream of the water electrolysis apparatus by applying a current to a pressurizing part anode and a pressurizing part cathode provided on both surfaces of an electrolyte membrane; and a controller configured to control a current applied to the water electrolysis apparatus and a current applied to the electrochemical hydrogen pressurizing apparatus, and, when the system is stopped, configured to perform a first decompression processing such that a decompression speed of the pressurizing part cathode of the electrochemical hydrogen pressurizing apparatus does not exceed a basic decompression speed and to perform a second decompression processing such that a decompression speed of the anode of the water electrolysis apparatus does not exceed the decompression speed of the pressurizing part cathode of the electrochemical hydrogen pressurizing apparatus.

According to the aspect of the present invention, since it is possible to prevent the pressurizing part cathode of the electrochemical hydrogen pressurizing apparatus from being abruptly decompressed due to the first decompression processing, it is possible to prevent the electrolyte membrane of the electrochemical hydrogen pressurizing apparatus from being damaged.

In addition, a state in which the pressure of the anode of the water electrolysis apparatus is higher than the pressure of the pressurizing part cathode of the electrochemical hydrogen pressurizing apparatus can be maintained by the second decompression processing. Incidentally, from the viewpoint of preventing the crossover in the water electrolysis apparatus, it is necessary to maintain the anode at a higher pressure than the cathode in the water electrolysis apparatus. Here, the cathode of the water electrolysis apparatus is in communication with the pressurizing part anode of the electrochemical hydrogen pressurizing apparatus and the pressure of the pressurizing part anode is equal to or lower than the pressure of the pressurizing part cathode, the pressurizing part cathode can be a higher pressure than that of the anode of the water electrolysis apparatus by the decompression speed of the pressurizing part cathode of the electrochemical hydrogen pressurizing apparatus through the first decompression processing being controlled, however, by maintaining the anode of the water electrolysis apparatus at a higher pressure than the pressurizing part cathode of the electrochemical hydrogen pressurizing apparatus through the second decompression processing, the anode of the water electrolysis apparatus can be made to a higher pressure state than the cathode. Accordingly, the crossover in the water electrolysis apparatus can be prevented.

Therefore, according to the hydrogen/oxygen producing system and the method of controlling the same of the present invention, it is possible to appropriately decompress the water electrolysis apparatus and the electrochemical hydrogen pressurizing apparatus when the system is stopped.

In the method of controlling a hydrogen/oxygen producing system, wherein, when the hydrogen/oxygen producing system is stopped, the controller may be controlled to apply a first decompression current to the electrochemical hydrogen pressurizing apparatus such that the decompression speed of the pressurizing part cathode of the electrochemical hydrogen pressurizing apparatus does not exceed the basic decompression speed, and to decompress the anode of the water electrolysis apparatus while applying a second decompression current to the water electrolysis apparatus according to an amount of the hydrogen used for a reaction in the electrochemical hydrogen pressurizing apparatus per unit time in accordance with the application of the first decompression current.

According to the aspect of the present invention, by applying the second decompression current, hydrogen gas can be newly generated and supplemented to the electrochemical hydrogen pressurizing apparatus in which the hydrogen gas is consumed according to application of the first decompression current. Accordingly, it is possible to prevent the hydrogen from being insufficient at the electrochemical hydrogen pressurizing apparatus, and it is possible to pressurize the hydrogen at the pressurizing part cathode of the electrochemical hydrogen pressurizing apparatus by applying the first decompression current. Accordingly, the first decompression processing can be performed.

In the method of controlling a hydrogen/oxygen producing system, when the hydrogen/oxygen producing system is stopped, the controller may be controlled to apply a first decompression current to the electrochemical hydrogen pressurizing apparatus such that the decompression speed of the pressurizing part cathode of the electrochemical hydrogen pressurizing apparatus does not exceed the basic decompression speed, and to decompress the anode of the water electrolysis apparatus while changing a second decompression current applied to the water electrolysis apparatus according to the first decompression current applied to the electrochemical hydrogen pressurizing apparatus.

According to the aspect of the present invention, since a consumption amount of the hydrogen used for a reaction on the pressurizing part anode of the electrochemical hydrogen pressurizing apparatus per unit time is determined by the first decompression current applied to the electrochemical hydrogen pressurizing apparatus, by applying the second decompression current, hydrogen gas can be newly generated and supplemented to the electrochemical hydrogen pressurizing apparatus in which the hydrogen gas is consumed. Accordingly, it is possible to prevent the hydrogen from being insufficient at the hydrogen gas pressurizing part and it is possible to pressurize the hydrogen at the pressurizing part cathode of the electrochemical hydrogen pressurizing apparatus by applying the first decompression current. Accordingly, the first decompression processing can be performed.

In the method of controlling a hydrogen/oxygen producing system, the hydrogen/oxygen producing system may further include: an oxygen storage part configured to store the oxygen generated by the water electrolysis apparatus; a hydrogen storage part configured to store the hydrogen pressurized by the electrochemical hydrogen pressurizing apparatus; and a fuel cell configured to consume the oxygen and the hydrogen, and the method of controlling a hydrogen/oxygen producing system may further include: when the hydrogen/oxygen producing system is stopped, controlling the controller to stop storage of the oxygen to the oxygen storage part and storage of the hydrogen to the hydrogen storage part, and to supply at least one of the oxygen and the hydrogen generated by applying the first decompression current and the second decompression current to the fuel cell.

According to the aspect of the present invention, in comparison with the case in which the generated oxygen and hydrogen are discharged to the atmosphere, energy balance of the system can be improved as a whole.

In the method of controlling a hydrogen/oxygen producing system, the controller may be controlled to determine an operation time of the fuel cell on the basis of a time length in which the first decompression current and the second decompression current are applied.

According to the aspect of the present invention, it is possible to use up the oxygen and hydrogen generated by applying the first decompression current and the second decompression current. Accordingly, energy balance of the system can be further improved as a whole.

In the hydrogen/oxygen producing system, the water electrolysis apparatus may be a solid polymer type using an anion exchange membrane, the electrochemical hydrogen pressurizing apparatus may be a solid polymer type using a proton exchange membrane, a fuel cell configured to generate electric power using the oxygen and the hydrogen may be provided, and the electric power generated by the fuel cell may be used for at least one of the water electrolysis apparatus and the electrochemical hydrogen pressurizing apparatus.

According to the aspect of the present invention, the electric power generated by the fuel cell can reduce power consumption when the hydrogen/oxygen producing system is stopped.

According to the aspect of the present invention, it is possible to provide a method of controlling a hydrogen/oxygen producing system and a hydrogen/oxygen producing system capable of appropriately decompressing a water electrolysis apparatus and an electrochemical hydrogen pressurizing apparatus when the system is stopped.

DETAILED DESCRIPTION OF THE INVENTION

Hereinafter, an embodiment of the present invention will be described with reference to the accompanying drawings.

A hydrogen/oxygen producing system 1 of the embodiment can produce hydrogen gas and oxygen gas in states of high pressure hydrogen gas and high pressure oxygen gas that have each been compressed to, for example, 1 to 100 MPa. The high pressure hydrogen gas produced by the hydrogen/oxygen producing system 1 can be stored in, for example, a hydrogen gas tank 2 (a hydrogen storage part) detachably attached to the hydrogen/oxygen producing system 1. The high pressure oxygen gas produced by the hydrogen/oxygen producing system 1 can be stored in, for example, an oxygen gas tank 3 (an oxygen storage part) detachably attached to the hydrogen/oxygen producing system 1.

<Configuration of Hydrogen/Oxygen Producing System 1>

A configuration of the hydrogen/oxygen producing system 1 of the embodiment will be described.

Figure 1:
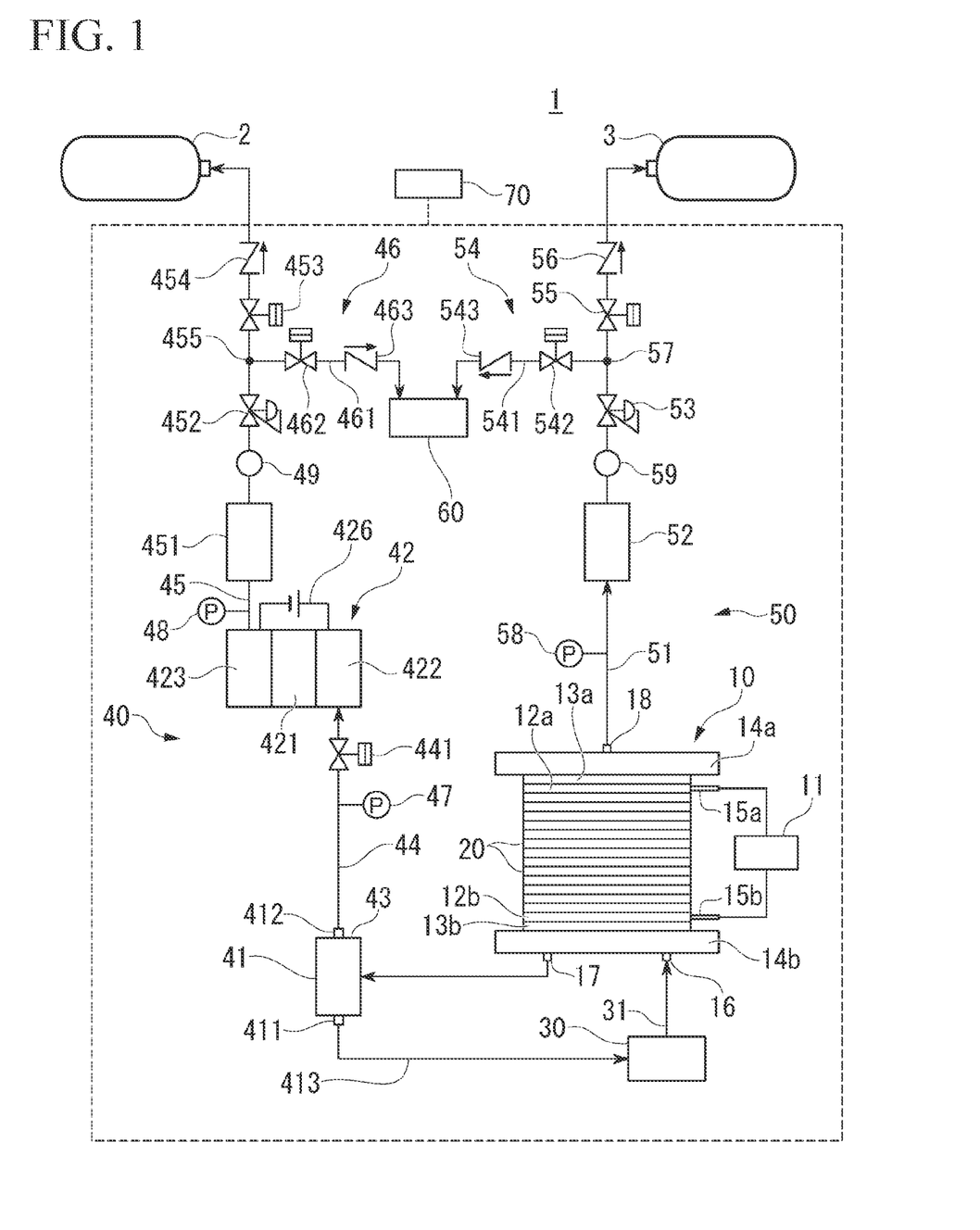
FIG. 1 is a view showing a configuration of a hydrogen/oxygen producing system according to an embodiment.

FIG. 1 is a view showing the configuration of the hydrogen/oxygen producing system according to the embodiment.

As shown in FIG. 1, the hydrogen/oxygen producing system 1 mainly includes a water electrolysis apparatus 10, a water supply part 30 (a supply part), a hydrogen discharge line 40, an oxygen discharge line 50, a fuel cell 60, and a controller 70.

The water electrolysis apparatus 10 has an electrolyte membrane (an ion exchange membrane) 211, and an anode 212 and a cathode 213 isolated from each other with the electrolyte membrane 211 interposed therebetween. The water electrolysis apparatus 10 electrolyzes water (water electrolysis) to generate oxygen gas on the anode 212 and generate hydrogen gas on the cathode 213. That is, the water electrolysis apparatus 10 is a so-called solid polymer type.

The water electrolysis apparatus 10 includes a cell unit in which a plurality of stacked unit cells 20 each including a set of the electrolyte membrane 211, the anode 212 and the cathode 213 are stacked. A terminal plate 12a, an insulating plate 13a and an end plate 14a are sequentially arranged outward at one end of the unit cells 20 in the cell unit in a stacking direction. In addition, a terminal plate 12b, an insulating plate 13b and an end plate 14b are sequentially arranged outward on the other end of the unit cells 20 in the cell unit in the stacking direction.

The plurality of unit cells 20 are integrally tightened and held between the end plates 14a and 14b. Terminal sections 15a and 15b are provided to protrude outward from side portions of the terminal plates 12a and 12b. A power supply 11 is electrically connected to the terminal sections 15a and 15b. The power supply 11 can apply the current to the anode 212 and the cathode 213 of the water electrolysis apparatus 10 via the terminal sections 15a and 15b.

Figure 2:
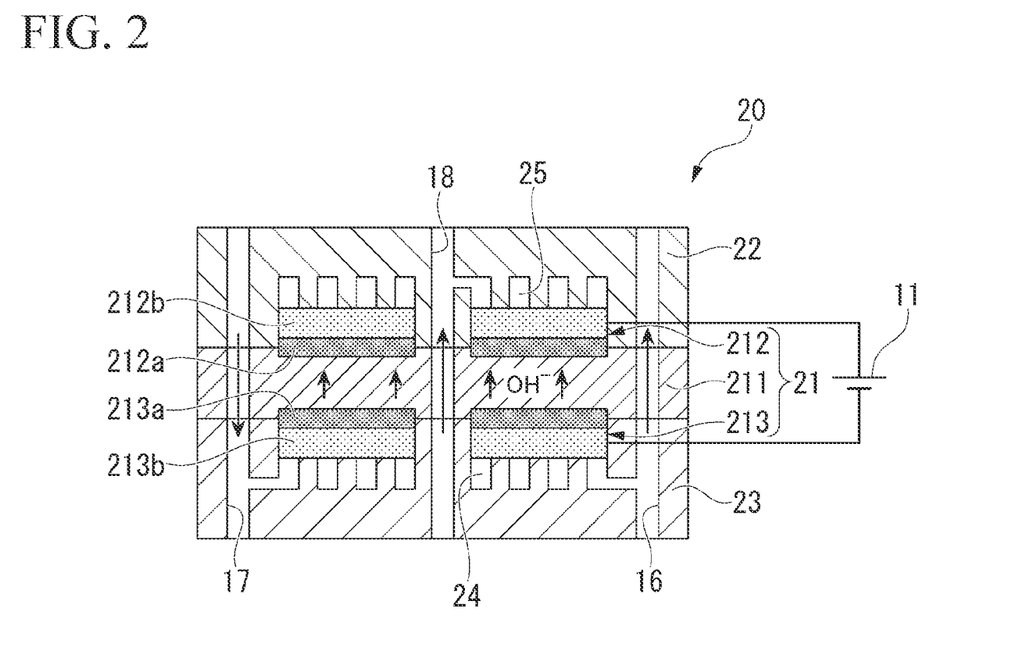
FIG. 2 is a view showing a cross-sectional structure of a unit cell of a water electrolysis apparatus according to the embodiment.

FIG. 2 is a view schematically showing a cross-sectional structure of the unit cell of the water electrolysis apparatus according to the embodiment. As shown in FIG. 2, each of the unit cells 20 includes, for example, a disk-shaped electrolyte membrane/electrode structure body 21 (a membrane electrode assembly (MEA)), and an anode-side separator 22 and a cathode-side separator 23, which are disk-shaped, with the electrolyte membrane/electrode structure body 21 interposed therebetween. The electrolyte membrane/electrode structure body 21 has the electrolyte membrane 211, and the anode 212 and the cathode 213 provided on both surfaces of the electrolyte membrane 211. In each of the unit cells 20, the anode 212 and the cathode 213 that interpose the electrolyte membrane 211 therebetween are sealed (isolated) by the electrolyte membrane 211, a seal member (not shown), or the like such that they are not in communication with each other.

In the embodiment, the electrolyte membrane 211 is, for example, an anion exchange membrane. That is, the electrolyte membrane 211 has anion conductivity that enables an anion (for example, a hydroxide ion OH$^-$) to be selectively moved. As an example of this type of the electrolyte membrane 211, there is a hydrocarbon-based solid polymer membrane (for example, polystyrene, a modified body thereof, or the like) having an anion exchange group (for example, a quaternary ammonium group, a pyridinium group, or the like). The electrolyte membrane is not limited to the anion exchange membrane, and the proton exchange membrane may be used.

The anode 212 has an anode electrode catalyst layer 212a and an anode-side power feeding body 212b formed on one surface of the electrolyte membrane 211. The cathode 213 has a cathode electrode catalyst layer 213a and a cathode-side power feeding body 213b formed on the other surface of the electrolyte membrane 211.

The cathode-side separator 23 is opposite to the cathode 213. A water channel 24 is formed between the cathode-side separator 23 and the cathode 213. The water channel 24 is formed by a concave section such as a groove or the like provided on a surface of the cathode-side separator 23 facing the cathode 213. Liquid water is supplied to the water channel 24, and hydrogen generated by a reaction and excessive liquid water flow therethrough. The anode-side separator 22 faces the anode 212. An oxygen channel 25 is formed between the anode-side separator 22 and the anode 212. The oxygen channel 25 is formed by a concave section such as a groove or the like provided in a surface of the anode-side separator 22 facing the anode 212. Oxygen generated by a reaction flows through the oxygen channel 25.

A water supply communication hole 16, a hydrogen discharge communication hole 17, and an oxygen discharge communication hole 18 are formed in the cell unit. Each of the water supply communication hole 16, the hydrogen discharge communication hole 17 and the oxygen discharge communication hole 18 is formed to pass through the unit cell 20 in the stacking direction. The hydrogen discharge communication hole 17 is in communication with the water channel 24 of each of the unit cells 20. The oxygen discharge communication hole 18 is in communication with the oxygen channel 25 of each of the unit cells 20. The water supply communication hole 16 is in communication with the water channel 24 of each of the unit cells 20, and in communication with the hydrogen discharge communication hole 17 via the water channel 24.

As shown in FIG. 1 and FIG. 2, the water supply communication hole 16, the hydrogen discharge communication hole 17 and the oxygen discharge communication hole 18 are open to the end plate 14a or the end plate 14b. Water is supplied from the water supply part 30 to the water supply communication hole 16 via a water supply channel 31. When the water supplied to the water supply communication hole 16 flows into the water channel 24, the water is supplied to the cathode 213 of each of the unit cells 20. When the power supply 11 applies the current to the anode 212 and the cathode 213 and the water supplied to the cathode 213 is water-electrolyzed, hydrogen gas is generated on the cathode 213 of each of the unit cells 20, and oxygen gas and water are generated on the anode 212 of each of the unit cells 20. The hydrogen gas generated on the cathode 213 is discharged from the hydrogen discharge communication hole 17 via the water channel 24 together with the unreacted water. The oxygen gas and water generated on the anode 212 are discharged from the oxygen discharge communication hole 18 via the oxygen channel 25.

As shown in FIG. 1, the water supply part 30 is connected to the water supply communication hole 16 via the water supply channel 31, and liquid water is supplied to the water electrolysis apparatus 10. Although not shown, the water supply part 30 includes a pure water generating part, a circulation pump, an ion exchanger, or the like. The pure water generating part generates, for example, pure water from tap water or the like. The circulation pump sends the liquid water (unreacted water) sent from a moisture eliminating part 41, which will be described below, to the water electrolysis apparatus 10 together with pure water generated in a pure water generating part. The ion exchanger removes impurities from the water (unreacted water and pure water) before supplying it to the water electrolysis apparatus 10. Further, the water supply part 30 is not limited to one having the above-mentioned configuration as long as the liquid water can be supplied to the water electrolysis apparatus 10.

The hydrogen discharge line 40 guides the hydrogen gas discharged from the water electrolysis apparatus 10 to the hydrogen gas tank 2. The hydrogen discharge line 40 includes the moisture eliminating part 41 and a hydrogen gas pressurizing part 42 in sequence from the side of the water electrolysis apparatus 10 toward the hydrogen gas tank 2. In addition, the hydrogen discharge line 40 includes a cathode discharge channel 43 configured to connect the water electrolysis apparatus 10 and the moisture eliminating part 41, a first hydrogen gas channel 44 configured to connect the moisture eliminating part 41 and the hydrogen gas pressurizing part 42, and a second hydrogen gas channel 45 configured to connect the hydrogen gas pressurizing part 42 and the hydrogen gas tank 2.

The cathode discharge channel 43 is connected to the hydrogen discharge communication hole 17 of the water electrolysis apparatus 10. Accordingly, the hydrogen gas discharged from the water electrolysis apparatus 10 flows through the cathode discharge channel 43. The cathode discharge channel 43 guides the hydrogen gas to the moisture eliminating part 41.

The moisture eliminating part 41 is constituted by a gas-liquid separator. A fluid containing the hydrogen gas flowing through the cathode discharge channel 43 is gas-liquid separated into a gas component and a liquid component in the moisture eliminating part 41. The moisture eliminating part 41 has a liquid discharge port 411 configured to discharge the separated liquid, and a gas discharge port 412 configured to discharge the separated gas. The liquid discharge port 411 is connected to the water supply part 30 via a circulation channel 413.

The first hydrogen gas channel 44 is connected to the gas discharge port 412 of the moisture eliminating part 41. The first hydrogen gas channel 44 guides a gas including the hydrogen gas discharged from the moisture eliminating part 41 to the hydrogen gas pressurizing part 42. A first hydrogen opening/closing valve 441 is provided on the first hydrogen gas channel 44. The first hydrogen opening/closing valve 441 is, for example, an electromagnetic valve, a motorized valve or a pneumatic valve, and opens and closes the first hydrogen gas channel 44 on the basis of the control of the controller 70.

The hydrogen gas pressurizing part 42 pressurizes the hydrogen gas flowing through the first hydrogen gas channel 44. The hydrogen gas pressurizing part 42 is an electrochemical hydrogen pressurizing apparatus (electrochemical hydrogen compressor: EHC) capable of compressing hydrogen gas electrochemically.

Figure 3:
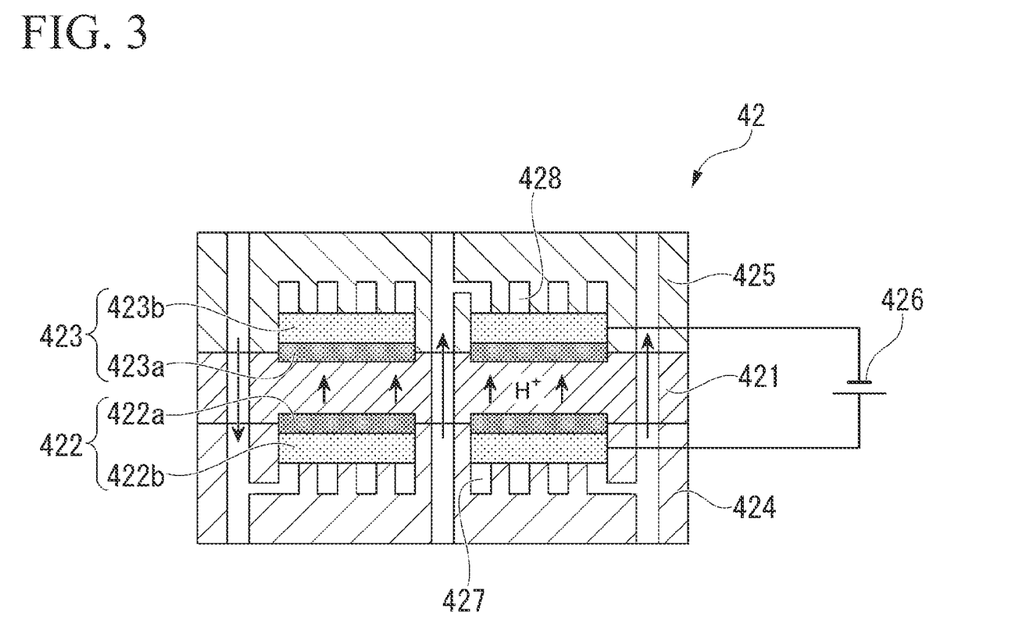
FIG. 3 is a view showing a cross-sectional structure of a hydrogen gas pressurizing part according to the embodiment.

FIG. 3 is a view schematically showing a cross-sectional structure of the hydrogen gas pressurizing part according to the embodiment.

As shown in FIG. 3, the hydrogen gas pressurizing part 42 has a pressurizing part proton exchange membrane 421 (an electrolyte membrane), a pressurizing part anode 422 and a pressurizing part cathode 423 isolated from each other with the pressurizing part proton exchange membrane 421 interposed therebetween, an anode-side separator 424 and a cathode-side separator 425 configured to interpose the pressurizing part proton exchange membrane 421, the pressurizing part anode 422 and the pressurizing part cathode 423, and a pressurizing part power supply 426 configured to apply a current to the pressurizing part anode 422 and the pressurizing part cathode 423. Further, the hydrogen gas pressurizing part 42 may have a unit structure in which a plurality of cells each having a set of the pressurizing part proton exchange membrane 421, the pressurizing part anode 422, the pressurizing part cathode 423, the anode-side separator 424 and the cathode-side separator 425 are stacked.

The pressurizing part proton exchange membrane 421 has proton conductivity that enables selective movement of a proton. While a material of the pressurizing part proton exchange membrane 421 is not particularly limited, as an example thereof, there is a fluorine system polymer membrane having a sulfonate group such as a perfluorosulfonic acid-based polymer or the like. When this type of the pressurizing part proton exchange membrane 421 is maintained in a wet state, the proton conductivity is expressed well.

The pressurizing part anode 422 has a pressurizing part anode electrode catalyst layer 422*a* and a pressurizing part anode gas diffusion layer 422*b* formed on one surface of the pressurizing part proton exchange membrane 421. The pressurizing part cathode 423 has a pressurizing part cathode electrode catalyst layer 423*a* and a pressurizing part cathode gas diffusion layer 423*b* formed on the other surface of the pressurizing part proton exchange membrane 421.

The anode-side separator 424 is facing the pressurizing part anode 422. A normal pressure hydrogen gas channel 427 is formed between the anode-side separator 424 and the pressurizing part anode 422. The normal pressure hydrogen gas channel 427 is formed by a concave section such as a groove or the like provided in a surface of the anode-side separator 424 facing the pressurizing part anode 422. The cathode-side separator 425 is facing the pressurizing part cathode 423. A high pressure hydrogen gas channel 428 is formed between the cathode-side separator 425 and the pressurizing part cathode 423. The high pressure hydrogen gas channel 428 is formed by a concave section such as a groove or the like provided in a surface of the cathode-side separator 425 facing the pressurizing part cathode 423.

A gas including the hydrogen gas discharged from the moisture eliminating part 41 flows into the normal pressure hydrogen gas channel 427 via the first hydrogen gas channel 44. Accordingly, the gas including the hydrogen gas is supplied to the pressurizing part anode 422. The pressurizing part power supply 426 applies a current to the pressurizing part anode 422 and the pressurizing part cathode 423, and the hydrogen gas pressurizing part 42 generates hydrogen gas with a higher pressure than the hydrogen gas supplied to the pressurizing part anode 422 using the pressurizing part cathode 423. The high pressure hydrogen gas generated on the pressurizing part cathode 423 is discharged from the hydrogen gas pressurizing part 42 via the high pressure hydrogen gas channel 428.

As shown in FIG. 1, the second hydrogen gas channel 45 is connected to the hydrogen gas pressurizing part 42 and in communication with the pressurizing part cathode 423. A downstream end of the second hydrogen gas channel 45 is connected to the hydrogen gas tank 2. The second hydrogen gas channel 45 guides the hydrogen gas discharged from the hydrogen gas pressurizing part 42 to the hydrogen gas tank 2.

A hydrogen gas dehumidification part 451, a hydrogen gas discharge regulation part 452, a hydrogen purging part 46, a second hydrogen opening/closing valve 453 and a second hydrogen check valve 454 are sequentially provided in the second hydrogen gas channel 45 from the side of the hydrogen gas pressurizing part 42 toward the hydrogen gas tank 2.

The hydrogen gas dehumidification part 451 dehumidifies the hydrogen gas discharged from the hydrogen gas pressurizing part 42. That is, the hydrogen gas dehumidification part 451 separates vapor from the hydrogen gas to bring the hydrogen gas to a desired dry state. As an example of the hydrogen gas dehumidification part 451, a cooling mechanism (not shown) such as a Peltier cooler or the like is exemplified. In this case, the cooling mechanism is cooled to a dew-point temperature or less corresponding to the desired dry state in the hydrogen gas to separate the moisture (vapor) contained in the hydrogen gas. Here, the temperature of the cooling mechanism may be controlled by the controller 70 according to, for example, an ambient temperature, a pressure of the hydrogen gas, or the like of the hydrogen/oxygen producing system 1.

In addition, as another example of the hydrogen gas dehumidification part 451, moisture absorbents such as zeolites, activated charcoals, silica gels, or the like (including a moisture getter agent or the like in a paste shape that can be used for coating). In this case, the hydrogen gas dehumidification part 451 may include a configuration in which moisture absorbents can be reproduced by thermal swing adsorption (TSA), pressure swing adsorption (PSA), or the like, or may include a configuration in which moisture absorbents can be exchanged. Further, the hydrogen gas dehumidification part 451 may dehumidify the hydrogen gas, and a specific configuration thereof is not limited to that described above.

The hydrogen gas discharge regulation part 452 adjusts the pressure of the hydrogen gas of the second hydrogen gas channel 45 by regulating the hydrogen gas passing through the hydrogen gas discharge regulation part 452. For example, the hydrogen gas discharge regulation part 452 reduces throughput amount of the hydrogen gas in the hydrogen gas discharge regulation part 452 to be smaller than the generating amount of the hydrogen gas on the pressurizing part cathode 423 of the hydrogen gas pressurizing part 42. Accordingly, the hydrogen gas discharge regulation part 452 can increase the pressure of the hydrogen gas of the second hydrogen gas channel 45 to obtain the high pressure hydrogen gas.

For example, the hydrogen gas discharge regulation part 452 is a back pressure valve that is opened while maintaining a pressure on a primary side (upstream side) at a set pressure. However, the hydrogen gas discharge regulation part 452 is not limited to the back pressure valve, and for example, may be an opening/closing valve configured to maintain the pressure of the second hydrogen gas channel 45 at the set pressure by controlling opening/closing of the valve using the controller 70.

The hydrogen gas discharge regulation part 452 adjusts the pressure of the hydrogen gas of the second hydrogen gas channel 45 to 1 to 100 MPa to obtain the high pressure hydrogen gas. Further, the hydrogen gas discharge regulation part 452 preferably has, for example, a high pressure hydrogen gas with a pressure of at least 8 MPa or more from the viewpoint of facilitating supply of the hydrogen gas to the hydrogen gas tank 2. In addition, for example, when hydrogen gas is supplied to a hydrogen gas tank or the like for a fuel cell automobile, the hydrogen gas discharge regulation part 452 preferably has a high pressure hydrogen gas with a pressure of 70 MPa or more.

The hydrogen purging part 46 is branched off from a channel between the hydrogen gas discharge regulation part 452 and the second hydrogen opening/closing valve 453. The hydrogen purging part 46 includes a hydrogen purging channel 461 extending from a branch section 455 of the second hydrogen gas channel 45. The hydrogen purging channel 461 can perform an operation of drawing the gas in the hydrogen/oxygen producing system 1 (decompression), for example, when the hydrogen/oxygen producing system 1 is stopped or the like. The hydrogen purging channel 461 guides the hydrogen gas flowing from the branch section 455 to the outside of the hydrogen/oxygen producing system 1. In the embodiment, a downstream end of the hydrogen purging channel 461 is connected to the fuel cell 60. A hydrogen purging opening/closing valve 462 and a hydrogen purging check valve 463 are sequentially provided in the hydrogen purging channel 461 from the side of the branch section 455 of the second hydrogen gas channel 45 toward a downstream side.

The hydrogen purging opening/closing valve 462 is, for example, an electromagnetic valve, a motorized valve or a pneumatic valve, and opens and closes the hydrogen purging channel 461 on the basis of the control of the controller 70. When the hydrogen purging opening/closing valve 462 is in a closed state, flowing of the hydrogen gas into the hydrogen purging channel 461 from the branch section 455 is regulated. When the hydrogen purging opening/closing valve 462 is in an open state, the hydrogen gas flows into the hydrogen purging channel 461 from the branch section 455, and the hydrogen gas is discharged to the outside of the hydrogen/oxygen producing system 1. In the embodiment, when the hydrogen purging opening/closing valve 462 is in an open state, the hydrogen gas is sent to the fuel cell 60. The hydrogen purging check valve 463 regulates a backflow of the gas from the outside of the hydrogen/oxygen producing system 1 toward the upstream side of the hydrogen purging channel 461 (the side of the branch section 455).

The second hydrogen opening/closing valve 453 is, for example, an electromagnetic valve, a motorized valve or a pneumatic valve, and opens and closes the second hydrogen gas channel 45 on the basis of the control of the controller 70. When the second hydrogen opening/closing valve 453 is in the open state, supply of the hydrogen gas from the second hydrogen gas channel 45 to the hydrogen gas tank 2 becomes possible.

The second hydrogen check valve 454 regulates a backflow of the hydrogen gas from the side of the hydrogen gas tank 2 toward the upstream side of the second hydrogen gas channel 45 (the side of the second hydrogen opening/closing valve 453).

A first pressure sensor 47, a second pressure sensor 48 and a first flowmeter 49 are provided on the hydrogen discharge line 40. The first pressure sensor 47 measures at least one of the pressure of the cathode 213 of the water electrolysis apparatus 10 and the pressure of the pressurizing part anode 422 of the hydrogen gas pressurizing part 42. The first pressure sensor 47 is provided upstream from the pressurizing part anode 422 of the hydrogen gas pressurizing part 42 and downstream from the cathode 213 of the water electrolysis apparatus 10. In the example shown, the first pressure sensor 47 is provided between the moisture eliminating part 41 and the hydrogen gas pressurizing part 42. More strictly, the first pressure sensor 47 is provided between the gas discharge port 412 and the first hydrogen opening/closing valve 441 of the moisture eliminating part 41. The second pressure sensor 48 measures a pressure of the pressurizing part cathode 423 of the hydrogen gas pressurizing part 42. The second pressure sensor 48 is provided downstream from the hydrogen gas pressurizing part 42 and upstream from the hydrogen gas discharge regulation part 452. In the example shown, the second pressure sensor 48 is provided between the pressurizing part cathode 423 and the hydrogen gas dehumidification part 451. The first flowmeter 49 measures a flow rate of the gas flowing through the second hydrogen gas channel 45. The first flowmeter 49 is, for example, a mass flow sensor. The first flowmeter 49 is provided downstream from the hydrogen gas dehumidification part 451 and upstream from the hydrogen gas discharge regulation part 452. Accordingly, the first flowmeter 49 can measure a flow rate of the high pressure hydrogen gas from which vapor is removed from the high pressure gas discharged from the hydrogen gas pressurizing part 42. Measurement values of the pressure sensors 47 and 48 and the first flowmeter 49 are observed by the controller 70.

The oxygen discharge line 50 guides the oxygen gas discharged from the water electrolysis apparatus 10 to the oxygen gas tank 3. The oxygen discharge line 50 includes an anode discharge channel 51 configured to connect the water electrolysis apparatus 10 and the oxygen gas tank 3. The anode discharge channel 51 is connected to the oxygen discharge communication hole 18 of the water electrolysis apparatus 10. Accordingly, oxygen gas and water flow through the anode discharge channel 51. An oxygen gas dehumidification part 52, an oxygen gas discharge regulation part 53, an oxygen purging part 54, an oxygen opening/closing valve 55 and an oxygen check valve 56 are sequentially provided in the anode discharge channel 51 from the side of the water electrolysis apparatus 10 toward the oxygen gas tank 3.

The oxygen gas dehumidification part 52 dehumidifies the oxygen gas discharged from the anode 212 of the water electrolysis apparatus 10. For example, the oxygen gas dehumidification part 52 can have the same configuration as that of the hydrogen gas dehumidification part 451. However, the oxygen gas dehumidification part 52 may be able to dehumidify the oxygen gas, and a specific configuration thereof is not particularly limited.

The oxygen gas discharge regulation part 53 regulates discharge of the oxygen gas from the water electrolysis apparatus 10 by regulating the oxygen gas passing through the oxygen gas discharge regulation part 53. For example, the oxygen gas discharge regulation part 53 reduces the throughput amount of the oxygen gas in the oxygen gas discharge regulation part 53 to be smaller than the generating amount of the oxygen gas on the anode 212 of the water electrolysis apparatus 10. Accordingly, the pressure of the oxygen gas of the anode 212 is increased to be a higher pressure than that of the hydrogen gas of the cathode 213, and a differential pressure is provided between the anode 212 and the cathode 213 of the water electrolysis apparatus 10. In addition, the pressure of the oxygen gas of the anode discharge channel 51 is increased to obtain the high pressure oxygen gas.

For example, the oxygen gas discharge regulation part 53 is a back pressure valve that is opened while maintaining the pressure on the primary side (upstream side) at the set pressure. However, the oxygen gas discharge regulation part 53 is not limited to the back pressure valve, and for example, may be an opening/closing valve or the like configured to maintain the pressure of the anode 212 and high pressure oxygen gas at the set pressure by controlling opening/closing of the valve using the controller 70.

The oxygen gas discharge regulation part 53 adjusts the pressure of the oxygen gas of the anode 212 to 1 to 100 MPa such that the pressure of the oxygen gas of the anode 212 is higher than the pressure of the hydrogen gas of the cathode 213. That is, when the hydrogen/oxygen producing system 1 is operated, the pressure of the hydrogen gas of the cathode 213 is maintained at less than 1 MPa.

The oxygen purging part 54 is branched off from a channel between the oxygen gas discharge regulation part 53 and the oxygen opening/closing valve 55. The oxygen purging part 54 includes an oxygen purging channel 541 extending from a branch section 57 of the anode discharge channel 51. The oxygen purging channel 541 is provided to enable an operation of drawing the gas in the hydrogen/oxygen producing system 1 (decompression), for example, when the hydrogen/oxygen producing system 1 is stopped or the like. The oxygen purging channel 541 guides the oxygen gas flowing from the branch section 57 to the outside of the hydrogen/oxygen producing system 1. In the embodiment, a downstream end of the oxygen purging channel 541 is connected to the fuel cell 60. An oxygen purging opening/closing valve 542 and an oxygen purging check valve 543 are sequentially provided in the oxygen purging channel 541 from the side of the branch section 57 of the anode discharge channel 51 toward a downstream side.

The oxygen purging opening/closing valve 542 is, for example, an electromagnetic valve, a motorized valve or a pneumatic valve, and opens and closes the oxygen purging channel 541 on the basis of the control of the controller 70.

When the oxygen purging opening/closing valve 542 is in a closed state, flowing of the oxygen gas into the oxygen purging channel 541 from the branch section 57 is regulated. When the oxygen purging opening/closing valve 542 is in an open state, the oxygen gas flows into the oxygen purging channel 541 from the branch section 57, and the oxygen gas is discharged to the outside of the hydrogen/oxygen producing system 1. In the embodiment, when the oxygen purging opening/closing valve 542 is in an open state, the oxygen gas is sent to the fuel cell 60. The oxygen purging check valve 543 regulates a backflow of the gas from the outside of the hydrogen/oxygen producing system 1 toward the upstream side of the oxygen purging channel 541 (toward the branch section 57).

The oxygen opening/closing valve 55 is, for example, an electromagnetic valve, a motorized valve or a pneumatic valve, and opens and closes the anode discharge channel 51 on the basis of the control of the controller 70. When the oxygen opening/closing valve 55 is in an open state, supply of the oxygen gas from the anode discharge channel 51 into the oxygen gas tank 3 becomes possible.

The oxygen check valve 56 regulates a backflow of the oxygen gas from the side of the oxygen gas tank 3 toward the upstream side of the anode discharge channel 51 (toward the oxygen opening/closing valve 55).

A third pressure sensor 58 and a second flowmeter 59 are provided on the oxygen discharge line 50. The third pressure sensor 58 measures the pressure of the anode 212 of the water electrolysis apparatus 10. The third pressure sensor 58 is provided upstream from the oxygen gas discharge regulation part 53 and downstream from the anode 212 of the water electrolysis apparatus 10. In the example shown, the third pressure sensor 58 is provided between the anode 212 and the oxygen gas dehumidification part 52 of the water electrolysis apparatus 10. The second flowmeter 59 measures a flow rate of the gas flowing through the anode discharge channel 51. The second flowmeter 59 is, for example, a mass flow sensor. The second flowmeter 59 is provided downstream from the oxygen gas dehumidification part 52 and upstream from the oxygen gas discharge regulation part 53. Accordingly, a second flowmeter 59 can measure a flow rate of the oxygen gas, from which the vapor is removed from the gas discharged from the water electrolysis apparatus 10. Measurement values of the third pressure sensor 58 and the second flowmeter 59 are observed by the controller 70.

The fuel cell 60 is connected to each of the hydrogen purging part 46 and the oxygen purging part 54 via a humidifier. However, in this system, it is also possible to flow a humidifying gas by changing dehumidification conditions of the hydrogen gas dehumidification part 451 and the oxygen gas dehumidification part 52. That is, the humidifier is not shown because it can be established without intervention of the humidifier before flowing into the fuel cell 60. The fuel cell 60 is, for example, a solid polymer type fuel cell. For example, the solid polymer type fuel cell includes a plurality of fuel cells that were stacked, and a pair of end plates that interpose the stacked body of the plurality of fuel cells. The fuel cell includes an electrolyte electrode structure body and a pair of separators that interpose the electrolyte electrode structure body. The electrolyte electrode structure body includes a solid polymer electrolyte membrane, and a fuel electrode and an oxygen electrode that interpose the solid polymer electrolyte membrane. The solid polymer electrolyte membrane includes a cation exchange membrane or the like. The fuel electrode (anode) includes an anode catalyst, a gas diffusion layer, and the like. The oxygen electrode (cathode) includes a cathode catalyst, a gas diffusion layer, and the like. The fuel cell 60 consumes hydrogen gas supplied to the anode from the hydrogen purging part 46 and oxygen gas supplied to the cathode from the oxygen purging part 54 to generate electric power.

The controller 70 generally controls operations of the hydrogen/oxygen producing system 1. The controller 70 observes and controls a current applied to the water electrolysis apparatus 10 and a current applied to the hydrogen gas pressurizing part 42. The controller 70 observes a measurement value of a flowmeter provided at each place of the hydrogen discharge line 40. The controller 70 is a software function part that functions as a predetermined program is executed by a processor such as a central processing unit (CPU) or the like. The software function part is an electronic control unit (ECU) including a processor such as a CPU or the like, a read only memory (ROM) on which a program is stored, a random access memory (RAM) on which data are temporarily stored, and an electronic circuit such as a timer or the like. At least a part of the controller 70 may be an integrated circuit such as large scale integration (LSI) or the like.

<Operation of Hydrogen/Oxygen Producing System 1>

An operation of the hydrogen/oxygen producing system 1 of the embodiment will be described.

When the hydrogen/oxygen producing system 1 is operated, liquid water is normally supplied to the water electrolysis apparatus 10 from the water supply part 30. The liquid water supplied to the water electrolysis apparatus 10 flows through the water channel 24 of the water electrolysis apparatus 10. Accordingly, the liquid water is supplied to the cathode 213 of the water electrolysis apparatus 10. The liquid water flowing through the water channel 24 of the water electrolysis apparatus 10 is discharged from the hydrogen discharge communication hole 17, is gas-liquid separated in the cathode discharge channel 43, and then, returns to the water supply part 30 through the circulation channel 413.

In the water electrolysis apparatus 10, when a current is applied to the anode 212 and the cathode 213, the liquid water in the water channel 24 is water-electrolyzed on the cathode 213. Accordingly, when a hydroxide ion OH⁻ conducts the electrolyte membrane 211 to reach the anode 212 while the hydrogen gas and the hydroxide ion OH⁻ are generated on the cathode 213, oxygen gas and water are generated on the anode 212.

The hydrogen gas generated on the cathode 213 is discharged to the hydrogen discharge communication hole 17 via the water channel 24 together with excessive water (unreacted water) that was not water-electrolyzed in the water electrolysis apparatus 10. That is, the fluid discharged to the hydrogen discharge communication hole 17 contains the hydrogen gas, the unreacted water of the liquid (liquid water), and the unreacted water of the gas (vapor). The oxygen gas and the water generated on the anode 212 is discharged to the oxygen discharge communication hole 18 via the oxygen channel 25.

The hydrogen gas generated on the cathode 213 is discharged to the cathode discharge channel 43 from the hydrogen discharge communication hole 17 together with the unreacted water and sent to the moisture eliminating part 41. The hydrogen gas and the unreacted water are gas-liquid separated in the moisture eliminating part 41. The liquid water in the unreacted water is discharged from the liquid discharge port 411 to return to the water supply part 30. The hydrogen gas and the vapor in the unreacted water are discharged to the first hydrogen gas channel 44.

The hydrogen gas and the vapor discharged to the first hydrogen gas channel 44 pass through the first hydrogen opening/closing valve 441 to be introduced into the hydrogen gas pressurizing part 42. The hydrogen gas and the vapor introduced into the hydrogen gas pressurizing part 42 are supplied to the pressurizing part anode 422. The pressure of the pressurizing part anode 422 is substantially the same as that of the cathode 213 of the water electrolysis apparatus 10 because a check valve, a back pressure valve, a decompression valve, or the like, is not provided between the hydrogen gas pressurizing part 42 and the water electrolysis apparatus 10. The pressurizing part proton exchange membrane 421 maintains a wet state using the vapor supplied to the pressurizing part anode 422.

When the current is applied to the pressurizing part anode 422 and the pressurizing part cathode 423, the hydrogen gas is ionized on the pressurizing part anode 422 to generate a proton. The generated proton conducts the pressurizing part proton exchange membrane 421 and reaches the pressurizing part cathode 423 to become the hydrogen gas. As a result, the hydrogen gas pressurizing part 42 generates the pressurized hydrogen gas on the pressurizing part cathode 423 by moving the proton from the pressurizing part anode 422 toward the pressurizing part cathode 423. For this reason, the hydrogen gas pressurizing part 42 can discharge the hydrogen gas with a higher pressure than that of the hydrogen gas supplied to the pressurizing part anode 422 from the pressurizing part cathode 423.

The hydrogen gas discharged from the pressurizing part cathode 423 flows through the second hydrogen gas channel 45. The hydrogen gas flowing through the second hydrogen gas channel 45 is introduced into the hydrogen gas dehumidification part 451 and dehumidified in the desired dry state, and then, adjusted to the set pressure by the hydrogen gas discharge regulation part 452. The hydrogen gas adjusted to the set pressure passes through the hydrogen purging part 46 to be guided to the hydrogen gas tank 2 or the hydrogen purging part 46. The hydrogen gas guided to the hydrogen purging part 46 is supplied to the fuel cell 60 when the hydrogen purging opening/closing valve 462 is in an open state.

The oxygen gas generated on the anode 212 is discharged from the oxygen discharge communication hole 18 to flow through the anode discharge channel 51 together with the water generated simultaneously. The oxygen gas and the water flowing through the anode discharge channel 51 are dehumidified by passing through the oxygen gas dehumidification part 52. That is, the oxygen gas dehumidification part 52 discharges the oxygen gas dehumidified in the desired dry state. The oxygen gas discharged from the oxygen gas dehumidification part 52 is adjusted to the set pressure by the oxygen gas discharge regulation part 53. The oxygen gas adjusted to the set pressure passes through the oxygen purging part 54 to be guided to the oxygen gas tank 3 or the oxygen purging part 54. The oxygen gas guided to the oxygen purging part 54 is supplied to the fuel cell 60 when the oxygen purging opening/closing valve 542 is in an open state. The fuel cell 60 performs power generation using the supplied hydrogen gas as a fuel gas and the supplied oxygen gas as an oxidant gas. In addition, while not shown, the fuel cell 60 may generate power due to supply of a gas from an oxygen tank 3 or a hydrogen tank 2. For example, electric power generated by the fuel cell 60 is stored in an electrical storage device (not shown).

<Method of Controlling Hydrogen/Oxygen Producing System 1>

A method of controlling the hydrogen/oxygen producing system 1 of the embodiment will be described.

First, a controlling method when hydrogen gas and oxygen gas are produced in the hydrogen/oxygen producing system 1 and stored in the hydrogen gas tank 2 and the oxygen gas tank 3 will be described. Further, control of the respective parts of the hydrogen/oxygen producing system 1 is performed by the controller 70.

When the hydrogen/oxygen producing system 1 is operated, the water supply part 30 normally supplies liquid water to the water electrolysis apparatus 10. Further, a supply quantity of the liquid water from the water supply part 30 to the water electrolysis apparatus 10 may be appropriately controlled according to operation situations of the respective parts of the hydrogen/oxygen producing system 1 (including a supply quantity of zero).

When the hydrogen/oxygen producing system 1 is started, the power supply 11 of the water electrolysis apparatus 10 applies a standby voltage in the vicinity of an electrolytic voltage between the anode 212 and the cathode 213 until it becomes a state in which the water electrolysis apparatus 10 can generate hydrogen gas and oxygen gas. Then, the power supply 11 applies the current to the anode 212 and the cathode 213 and starts the water electrolysis by increasing a voltage applied between the anode 212 and the cathode 213 to obtain an electrolytic voltage when it becomes a state in which the water electrolysis apparatus 10 can generate hydrogen gas and oxygen gas. Accordingly, the water electrolysis apparatus 10 generates oxygen gas on the anode 212 while generating hydrogen gas on the cathode 213.

The controlling method according to storage of the hydrogen gas will be described.

When the hydrogen/oxygen producing system 1 is operated, the first hydrogen opening/closing valve 441 is in an open state. Accordingly, the hydrogen gas generated on the cathode 213 is supplied to the hydrogen gas pressurizing part 42. The hydrogen gas pressurizing part 42 starts to apply an operation current to the pressurizing part anode 422 and the pressurizing part cathode 423 using the pressurizing part power supply 426 when supply of the hydrogen gas to the pressurizing part anode 422 is confirmed. For example, the controller 70 determines supply of the hydrogen gas to the pressurizing part anode 422 on the basis of the measurement value of the first pressure sensor 47. The operation current is a large current capable of producing the pressurized hydrogen gas on the pressurizing part cathode 423. Accordingly, the hydrogen gas pressurizing part 42 boosts the hydrogen gas.

When the hydrogen/oxygen producing system 1 is operated, a generating amount of the hydrogen gas in the water electrolysis apparatus 10 and an intake amount of the hydrogen gas in the hydrogen gas pressurizing part 42 are controlled to maintain the pressure of the hydrogen gas at less than 1 MPa (for example, 0.01 to 0.9 MPa) until the hydrogen gas is pressurized by the hydrogen gas pressurizing part 42. That is, the pressure of the hydrogen gas in the cathode 213, the cathode discharge channel 43 and the first hydrogen gas channel 44 is maintained at less than 1 MPa.

The hydrogen gas discharge regulation part 452 adjusts the pressure of the hydrogen gas in the second hydrogen gas channel 45. For example, the hydrogen gas discharge regulation part 452 adjusts the pressure of the hydrogen gas in the second hydrogen gas channel 45 by adjusting the throughput amount of the hydrogen gas in the hydrogen gas discharge regulation part 452 with respect to the generating amount of the hydrogen gas in the pressurizing part cathode 423. In the embodiment, the hydrogen gas discharge regulation part 452 is a back pressure valve. In this case, the hydrogen gas discharge regulation part 452 opens the valve while maintaining the pressure of the hydrogen gas on the primary side when the pressure of the hydrogen gas on the primary side is increased and reaches the pressure set within a range of, for example, 1 to 100 MPa. Accordingly, it is possible to supply a high pressure hydrogen gas that is pressurized to a set pressure of the hydrogen gas discharge regulation part 452 on a secondary side.

When the hydrogen/oxygen producing system 1 is operated, the hydrogen purging opening/closing valve 462 is controlled to become a closed state, and the second hydrogen opening/closing valve 453 is controlled to become an open state. The high pressure hydrogen gas adjusted to the set pressure in the hydrogen gas discharge regulation part 452 passes through the second hydrogen opening/closing valve 453 and the second hydrogen check valve 454 to be filled in the hydrogen gas tank 2. Here, the backflow of the hydrogen gas from the side of the hydrogen gas tank 2 toward the second hydrogen opening/closing valve 453 is regulated by the second hydrogen check valve 454.

As described above, the hydrogen/oxygen producing system 1 can pressurize the hydrogen gas produced on the cathode 213 of the water electrolysis apparatus 10 using the hydrogen gas pressurizing part 42 to produce the high pressure hydrogen gas, and the hydrogen gas tank 2 can be filled with the high pressure hydrogen gas.

The controlling method related to storage of the oxygen gas will be described.

The oxygen gas discharge regulation part 53 adjusts the pressure of the oxygen gas of the anode discharge channel 51. For example, the oxygen gas discharge regulation part 53 adjusts the pressure of the oxygen gas of the anode 212 by adjusting the throughput amount of the oxygen gas in the oxygen gas discharge regulation part 53 with respect to the generating amount of the oxygen gas in the anode 212. The oxygen gas discharge regulation part 53 increases the pressure of the oxygen gas of the anode 212 to 1 MPa or more. Accordingly, the pressure of the oxygen gas of the anode 212 in the water electrolysis apparatus 10 is maintained at a higher pressure than the pressure of the hydrogen gas of the cathode 213.

In the embodiment, the oxygen gas discharge regulation part 53 is a back pressure valve. In this case, the oxygen gas discharge regulation part 53 opens the valve while maintaining the pressure of the oxygen gas on the primary side when the pressure of the oxygen gas on the primary side is increased to reach the pressure set within a range of, for example, 1 to 100 MPa. Accordingly, the high pressure oxygen gas pressurized to the set pressure can be supplied to the secondary side of the oxygen gas discharge regulation part 53 while maintaining the anode 212 at the set pressure with a higher pressure than that of the cathode 213.

When the hydrogen/oxygen producing system 1 is operated, the oxygen purging opening/closing valve 542 is controlled to become a closed state, and the oxygen opening/closing valve 55 is controlled to become an open state. The high pressure oxygen gas adjusted to the set pressure in the oxygen gas discharge regulation part 53 passes through the oxygen opening/closing valve 55 and the oxygen check valve 56 to be filled in the oxygen gas tank 3. Here, a backflow of the oxygen gas from the side of the oxygen gas tank toward the oxygen opening/closing valve 55 can be prevented by the oxygen check valve 56.

As described above, the hydrogen/oxygen producing system 1 can generate a high pressure oxygen gas and the oxygen gas tank 3 can be filled with the high pressure oxygen gas while pressurizing the oxygen gas generated on the anode 212 of the water electrolysis apparatus 10 and generating a differential pressure in the hydrogen/oxygen producing system 1.

Next, the controlling method when the hydrogen/oxygen producing system 1 is stopped will be described. Further, control of the respective parts of the hydrogen/oxygen producing system 1 is performed by the controller 70.

When the hydrogen/oxygen producing system 1 is stopped, the controller 70 observes measurement values of the pressure sensors 47, 48 and 58, performs first decompression processing such that a decompression speed of the pressurizing part cathode 423 of the hydrogen gas pressurizing part 42 does not exceed a basic decompression speed and performs second decompression processing such that a decompression speed of the anode 212 of the water electrolysis apparatus 10 does not exceed a decompression speed of the pressurizing part cathode 423 of the hydrogen gas pressurizing part 42. Accordingly, a state in which the pressure on the anode 212 is higher than the pressure on the pressurizing part cathode 423 is maintained. In addition, since the pressure on the cathode 213 is lower than the pressure on the pressurizing part cathode 423, a state in which the pressure on the anode 212 is higher than the pressure on the cathode 213 is maintained. The basic decompression speed is a decompression speed to avoid destruction due to abrupt expansion of the dissolution gas to the member upon decompression, may be a prescribed value that is previously determined, or may be varied according to an external environment (an air temperature or the like) of the hydrogen/oxygen producing system 1.

In the first decompression processing, the controller 70 performs pressure adjustment using the hydrogen gas discharge regulation part 452 of the hydrogen discharge line 40 and applies the first decompression current to the pressurizing part anode 422 and the pressurizing part cathode 423 such that the pressurizing part cathode 423 of the hydrogen gas pressurizing part 42 does not exceed the basic decompression speed. The controller 70 reduces the pressure of the pressurizing part cathode 423 by adjusting the pressure of the hydrogen gas discharge regulation part 452. The controller 70 controls the pressurizing part power supply 426 so as to apply the current that can suppress the crossover in the hydrogen gas pressurizing part 42 to the pressurizing part anode 422 and the pressurizing part cathode 423 as the first decompression current. That is, the first decompression current is a current that can obtain a membrane pumping effect using the hydrogen gas pressurizing part 42. The first decompression current may be varied according to the external environment (the air temperature or the like) of the hydrogen/oxygen producing system 1. By suppressing the crossover in the hydrogen gas pressurizing part 42, even the first hydrogen opening/closing valve 441 in the first hydrogen gas channel 44 is in an open state and a check valve is not provided between the hydrogen gas pressurizing part 42 and the water electrolysis apparatus 10, a backflow of the hydrogen gas from the hydrogen gas pressurizing part 42 toward the water electrolysis apparatus 10 is prevented. The current that can suppress the crossover in the hydrogen gas pressurizing part 42 is decreased as the decompression of the pressurizing part cathode 423 progresses. That is, in the first decompression processing, the output voltage of the power supply 11 is gradually lowered, and the current applied through the pressurizing part anode 422 and the pressurizing part cathode 423 is reduced.

Moisture evaporation in the pressurizing part proton exchange membrane 421 according to abrupt decompression and membrane breakage due to expansion of the gas intruded into a seal material can be suppressed by performing the first decompression processing in this way. In addition, since the backflow of the high pressure hydrogen gas to the first hydrogen gas channel 44 according to the crossover can be suppressed, an increase in pressure of the cathode 213 of the water electrolysis apparatus 10 can be suppressed.

In the second decompression processing, the controller 70 performs pressure adjustment using the oxygen gas discharge regulation part 53 of the oxygen discharge line 50 and applies the second decompression current to the anode 212 and the cathode 213 such that the decompression speed of the anode 212 of the water electrolysis apparatus 10 does not exceed the decompression speed of the pressurizing part cathode 423 of the hydrogen gas pressurizing part 42. The controller 70 reduces the pressure of the anode 212 by adjusting the pressure of the oxygen gas discharge regulation part 53. The controller 70 controls the power supply 11 to apply the current that can generate the hydrogen gas consumed on the pressurizing part anode 422 of the hydrogen gas pressurizing part 42 at the cathode 213 to the anode 212 and the cathode 213 as the second decompression current. Specifically, the controller 70 detects a consumption amount of hydrogen per unit time used in a reaction on the pressurizing part anode 422 as the first decompression current is applied, and controls the power supply 11 to apply the second decompression current determined according to the detected consumption amount.

For example, the controller 70 detects a consumption amount of the hydrogen per unit time on the basis of a flow rate of the hydrogen gas discharged from the hydrogen gas pressurizing part 42, which is equivalent to a consumption amount of the hydrogen in the pressurizing part anode 422. In this case, the controller 70 detects a consumption amount of the hydrogen on the basis of the measurement value of the first flowmeter 49 provided on the hydrogen discharge line 40. The controller 70 previously stores map information that defines correspondence of the second decompression current that can be set to the detected consumption amount of the hydrogen on the storage part such as a memory or the like. The power supply 11 applies the second decompression current to the anode 212 and the cathode 213 on the basis of the map information stored by the controller 70. Since the first decompression current decreases as the first decompression processing advances the consumption amount of the hydrogen in the pressurizing part anode 422 also gradually decreases, and the second decompression current also decreases as the second decompression processing advances. That is, in the second decompression processing, the output voltage of the power supply 11 is gradually decreased, and the current applied to the anode 212 and the cathode 213 is reduced. Further, the second decompression current may include a current sufficient to compensate for the oxygen gas excessively decompressed by the pressure adjustment of the oxygen gas discharge regulation part 53.

By performing the second decompression processing in this way, the hydrogen gas generated by the water electrolysis apparatus 10 is supplied to the hydrogen gas pressurizing part 42 to maintain the cathode 213 at a normal pressure, and the operation of the hydrogen gas pressurizing part 42 can be maintained. Accordingly, the above-mentioned first decompression processing can be executed.

Here, before or after the first decompression processing is started, the hydrogen purging opening/closing valve 462 is made to an open state and the second hydrogen opening/closing valve 453 is made to a closed state. Accordingly, the hydrogen generated through application of the first decompression current to the hydrogen gas pressurizing part 42 is supplied to the fuel cell 60 while storage of the hydrogen in the hydrogen gas tank 2 is stopped.

In addition, before or after the second decompression processing is started, the oxygen purging opening/closing valve 542 is made to an open state and the oxygen opening/closing valve 55 is made to a closed state. Accordingly, the oxygen gas generated through application of the second decompression current to the water electrolysis apparatus 10 is supplied to the fuel cell 60 while storage of the oxygen in the oxygen gas tank 3 is stopped. Here, the controller 70 performs at least one of adjustment of the opening degrees of the hydrogen purging opening/closing valve 462 and the oxygen purging opening/closing valve 542 and adjustment of the pressure by the hydrogen gas discharge regulation part 452 and the oxygen gas discharge regulation part 53 so as to maintain a state in which the supply pressure of the hydrogen gas to the fuel cell 60 is higher than the supply pressure of the oxygen gas to the fuel cell 60.

The controller 70 determines an operation time of the fuel cell 60 on the basis of a time length in which the first decompression current and the second decompression current are applied. For example, the controller 70 controls the fuel cell 60 such that electric power conversion of the generated electric power is performed for a determined operation time length. The fuel cell 60 outputs the converted electric power to the electrical storage device.

When the pressurizing part cathode 423 and the anode 212 are decompressed to the extent that there is no concern that the crossover will occur in the water electrolysis apparatus 10, application of the current to the water electrolysis apparatus 10 and application of the current to the hydrogen gas pressurizing part 42 are stopped. When application of the current to the water electrolysis apparatus 10 is stopped, supply of the water to the water electrolysis apparatus 10 by the water supply part 30 is stopped. Then, when the output of the fuel cell 60 is performed for the operation time, an actuation of the fuel cell 60 is stopped. Accordingly, the hydrogen/oxygen producing system 1 is made to a stopped state.

As described above, in the hydrogen/oxygen producing system 1 of the embodiment, when the system is stopped, the first decompression processing is performed such that the decompression speed of the pressurizing part anode 422 of the hydrogen gas pressurizing part 42 does not exceed the basic decompression speed and the second decompression processing is performed such that the decompression speed of the anode 212 of the water electrolysis apparatus 10 does not exceed the decompression speed of the pressurizing part cathode 423 of the hydrogen gas pressurizing part 42. According to this method, since abrupt decompression of the pressurizing part cathode 423 of the hydrogen gas pressurizing part 42 can be prevented by the first decompression processing, destruction of the pressurizing part proton exchange membrane 421 of the hydrogen gas pressurizing part 42 can be prevented.

In addition, a state in which the pressure of the anode 212 is higher than the pressure of the pressurizing part cathode 423 can be maintained by the second decompression processing. Incidentally, from the viewpoint of suppressing the crossover in the water electrolysis apparatus 10, it is necessary to maintain the anode 212 at a higher pressure than that of the cathode 213 in the water electrolysis apparatus 10. Here, the cathode 213 is in communication with the pressurizing part anode 422 and the pressure of the pressurizing part anode 422 is equal to or lower than the pressure of the pressurizing part cathode 423, the pressurizing part cathode 423 can be a higher pressure than that of the anode 212 by the decompression speed of the pressurizing part cathode 423 through the first decompression processing being controlled, however, by maintaining the anode 212 at a higher pressure than the pressurizing part cathode 423 through the second decompression processing, the anode 212 can be made to a higher pressure state than the cathode 213. Accordingly, the crossover in the water electrolysis apparatus 10 can be controlled in one direction, and deterioration of the member due to gas mixing can be avoided.

Therefore, according to the hydrogen/oxygen producing system 1 of the embodiment and the method of controlling the same, the water electrolysis apparatus 10 and the hydrogen gas pressurizing part 42 can be appropriately decompressed when the system is stopped.

In the embodiment, the first decompression processing and the second decompression processing are performed while the current is applied to the water electrolysis apparatus 10 and the hydrogen gas pressurizing part 42. Here, an action of applying the current to the water electrolysis apparatus 10 and the hydrogen gas pressurizing part 42 will be described using FIG. 4.

Figure 4:
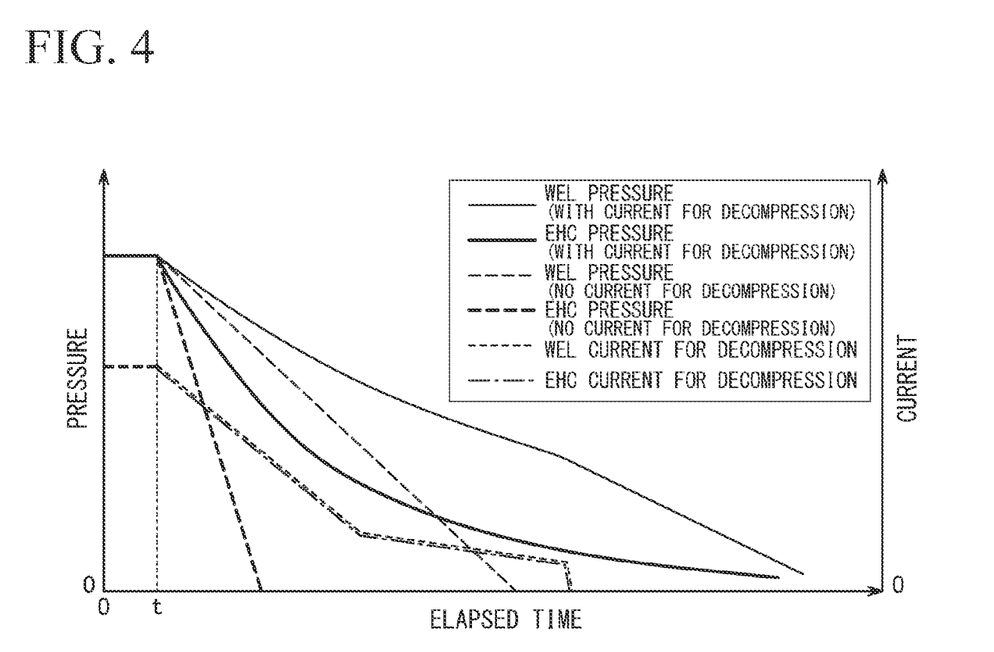
FIG. 4 is a graph showing a pressure change in the water electrolysis apparatus and the hydrogen gas pressurizing part.

FIG. 4 is a graph showing pressure changes in the water electrolysis apparatus and the hydrogen gas pressurizing part. In FIG. 4, a horizontal axis indicates an elapsed time, a first vertical axis on the left side indicates a pressure, and a second vertical axis on the right side indicates a current. In FIG. 4, a WEL pressure indicates a pressure on the anode 212 of the water electrolysis apparatus 10, and an EHC pressure indicates a pressure on the pressurizing part cathode 423 of the hydrogen gas pressurizing part 42. In addition, a WEL decompression current indicates current applied to the water electrolysis apparatus 10, and an EHC decompression current indicates a current applied to the hydrogen gas pressurizing part 42. Further, in the example shown in FIG. 4, decompression is started by starting to shut down or reducing the current at time t.

As shown in FIG. 4, when the current is not applied to the water electrolysis apparatus 10 and the hydrogen gas pressurizing part 42, since the decompression speed of the pressurizing part cathode 423 is greater than the decompression speed of the anode 212, a state in which the anode 212 is in a higher pressure state than the pressurizing part cathode 423 can be maintained. In addition, the decompression speed of the pressurizing part cathode 423 is decreased by applying the current to the hydrogen gas pressurizing part 42, and the decompression speed of the anode 212 is decreased by applying the current to the water electrolysis apparatus 10. For this reason, when "the EHC pressure (with the decompression current)" and "the WEL pressure (with no decompression current)" in FIG. 4 are compared, in a case the current is applied to the hydrogen gas pressurizing part 42 and the current is not applied to the water electrolysis apparatus 10, the decompression speed of the pressurizing part cathode 423 gets lower than the decompression speed of the anode 212, and the pressurizing part cathode 423 can become a higher pressure than the anode 212. Therefore, in a case the current is applied to the hydrogen gas pressurizing part 42, by appropriately applying the current to the water electrolysis apparatus 10, the anode 212 can be maintained at a higher pressure than the pressurizing part cathode 423.

In addition, when the hydrogen/oxygen producing system 1 is stopped, the first decompression current is applied to the hydrogen gas pressurizing part 42 such that the decompression speed of the pressurizing part cathode 423 of the hydrogen gas pressurizing part 42 does not exceed the basic decompression speed. Further, the anode 212 of the water electrolysis apparatus 10 is decompressed while applying the second decompression current to the water electrolysis apparatus 10 according to an amount of the hydrogen per unit time used in the reaction on the hydrogen gas pressurizing part 42 in accordance with the application of the first decompression current. According to this method, by applying the second decompression current, hydrogen gas can be newly generated and supplemented to the hydrogen gas pressurizing part 42 in which the hydrogen gas is consumed according to application of the first decompression current. Accordingly, it is possible to prevent the hydrogen from being insufficient at the hydrogen gas pressurizing part 42, and it is possible to pressurize the hydrogen at the pressurizing part cathode 423 by applying the first decompression current. Accordingly, the first decompression processing can be performed.

When the hydrogen/oxygen producing system 1 is stopped, the oxygen and the hydrogen generated through application of the first decompression current and the second decompression current are supplied to the fuel cell 60 while storage of the oxygen into the oxygen gas tank 3 and storage of the hydrogen into the hydrogen gas tank 2 are stopped. Accordingly, in comparison with the case in which the generated oxygen and hydrogen are discharged to the atmosphere, an energy balance of the system can be improved as a whole.

Further, the controller 70 determines an operation time of the fuel cell 60 on the basis of the application time of the first decompression current and the second decompression current. Accordingly, it is possible to use up the oxygen and the hydrogen generated through application of the first decompression current and the second decompression current. Accordingly, an energy balance of the system can be further improved as a whole.

Further, in the embodiment, the second decompression current is associated with the amount of the hydrogen consumed by the pressurizing part anode 422 per unit time according to the application of the first decompression current. However, the second decompression current may be associated with the first decompression current, and may be varied according to the detected first decompression current. In this case, the controller 70 previously stores map information that defines correspondence of the second decompression current that can be set with respect to the detected first decompression current in a storage part such as a memory or the like. According to this method, since the consumption amount of the hydrogen used for the reaction on the pressurizing part anode 422 per unit time is determined by the first decompression current applied to the hydrogen gas pressurizing part 42, by applying the second decompression current, hydrogen gas can be newly generated and supplemented to the hydrogen gas pressurizing part 42 in which the hydrogen gas is consumed. Accordingly, it is possible to prevent the hydrogen from being insufficient at the hydrogen gas pressurizing part 42 and it is possible to pressurize the hydrogen at the pressurizing part cathode 423 by applying the first decompression current. Accordingly, the first decompression processing can be performed.

In addition, the second decompression current may be further associated with the pressure difference between the pressurizing part anode 422 and the pressurizing part cathode 423 in addition to the first decompression current. Accordingly, in addition to the amount of the crossover of the hydrogen in the pressurizing part proton exchange membrane 421 according to the pressure difference, hydrogen gas can be newly generated and supplemented to the hydrogen gas pressurizing part 42 by applying the second decompression current.

Further, the present invention is not limited to the above-mentioned embodiment described with reference to the accompanying drawings, and various variants may be made without departing from the technical scope of the present invention.

For example, while the controller 70 generally controls the hydrogen/oxygen producing system 1 as a whole in the embodiment, some of the functions of the controller 70 may be realized by the respective control parts of the hydrogen/oxygen producing system 1.

In addition, while the hydrogen/oxygen producing system 1 is formed such that both of the generated oxygen and hydrogen can be stored in the gas tanks in the embodiment, an application range of the present invention is not limited thereto. The present invention can be applied to a hydrogen/oxygen producing system for the purpose of supplying at least the hydrogen in the generated oxygen and hydrogen. However, in order to obtain a good power generation reaction at a place in which an oxygen partial pressure or an oxygen concentration is low in the fuel cell or the like, it is desirable to supply high purity oxygen generated in the water electrolysis apparatus to the fuel cell. For this reason, in the hydrogen/oxygen producing system, it is preferable to recover both of the hydrogen gas and the oxygen gas generated in the water electrolysis apparatus.

In addition, while the electric power generated by the fuel cell 60 is stored in the electrical storage device in the embodiment, the generated electric power may be diverted to at least one of the first decompression current and the second decompression current. That is, the generated electric power of the fuel cell 60 may be used for at least one of the water electrolysis apparatus 10 and the hydrogen gas pressurizing part 42. Accordingly, the power consumption when the hydrogen/oxygen producing system 1 is stopped can be reduced. Further, it is also the same as when the electric power stored in the electrical storage device is used for at least one of the water electrolysis apparatus 10 and the hydrogen gas pressurizing part 42.

In addition, while both of the oxygen gas and the hydrogen gas generated according to the decompression processing are supplied to the fuel cell 60 in the embodiment, there is no limitation thereto. For example, only the generated hydrogen gas may be supplied to the fuel cell, and the atmosphere may be used as an oxidant gas in the fuel cell.

In addition, in the embodiment, the controller 70 in the second decompression processing detects a consumption amount of the hydrogen in the pressurizing part anode 422 of the hydrogen gas pressurizing part 42 on the basis of the flow rate of the hydrogen gas discharged from the hydrogen gas pressurizing part 42 by using the first flowmeter 49. However, a method of detecting a consumption amount of the hydrogen in the pressurizing part anode 422 is not limited thereto. For example, a consumption amount of the hydrogen in the pressurizing part anode 422 may be detected on the basis of the increasing rate of the pressure of the hydrogen gas on the downstream side of the hydrogen gas pressurizing part 42. In this case, the flow rate of the hydrogen gas discharged from the hydrogen gas pressurizing part 42 can be converted on the basis of the time change rate of the opening degree of the hydrogen gas discharge regulation part 452 or the like.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A method of controlling a hydrogen/oxygen producing system,
   the hydrogen/oxygen producing system comprising:
   a water electrolysis apparatus configured to electrolyze liquid water by applying a current to an anode and a cathode provided on both surfaces of an electrolyte membrane, generate hydrogen at the cathode, and generate oxygen at the anode with a higher pressure than that of the hydrogen;
   a supply part configured to supply the liquid water to the water electrolysis apparatus;
   an electrochemical hydrogen pressurizing apparatus configured to pressurize the hydrogen at a downstream of the water electrolysis apparatus by applying a current to a pressurizing part anode and a pressurizing part cathode provided on both surfaces of an electrolyte membrane; and
   a controller configured to control a current applied to the water electrolysis apparatus and a current applied to the electrochemical hydrogen pressurizing apparatus,
   wherein the method of controlling a hydrogen/oxygen producing system comprises:
   when the hydrogen/oxygen producing system is stopped, controlling the controller to perform a first decompression processing such that a decompression speed of the pressurizing part cathode of the electrochemical hydrogen pressurizing apparatus does not exceed a basic decompression speed, and to perform a second decompression processing such that a decompression speed of the anode of the water electrolysis apparatus does not exceed the decompression speed of the pressurizing part cathode of the electrochemical hydrogen pressurizing apparatus.

2. The method of controlling a hydrogen/oxygen producing system according to claim 1, wherein, when the hydrogen/oxygen producing system is stopped, the controller is controlled to apply a first decompression current to the electrochemical hydrogen pressurizing apparatus such that the decompression speed of the pressurizing part cathode of the electrochemical hydrogen pressurizing apparatus does not exceed the basic decompression speed, and to decompress the anode of the water electrolysis apparatus while applying a second decompression current to the water electrolysis apparatus according to an amount of the hydrogen used for a reaction in the electrochemical hydrogen pressurizing apparatus per unit time in accordance with the application of the first decompression current.

3. The method of controlling a hydrogen/oxygen producing system according to claim 1, wherein, when the hydrogen/oxygen producing system is stopped, the controller is controlled to apply a first decompression current to the electrochemical hydrogen pressurizing apparatus such that the decompression speed of the pressurizing part cathode of the electrochemical hydrogen pressurizing apparatus does not exceed the basic decompression speed, and to decompress the anode of the water electrolysis apparatus while changing a second decompression current applied to the water electrolysis apparatus according to the first decompression current applied to the electrochemical hydrogen pressurizing apparatus.

4. The method of controlling a hydrogen/oxygen producing system according to claim 2,
   wherein the hydrogen/oxygen producing system further comprises:
   an oxygen storage part configured to store the oxygen generated by the water electrolysis apparatus;
   a hydrogen storage part configured to store the hydrogen pressurized by the electrochemical hydrogen pressurizing apparatus; and
   a fuel cell configured to consume the oxygen and the hydrogen, and
   wherein the method of controlling a hydrogen/oxygen producing system further comprises:
   when the hydrogen/oxygen producing system is stopped, controlling the controller to stop storage of the oxygen to the oxygen storage part and storage of the hydrogen to the hydrogen storage part, and to supply at least one of the oxygen and the hydrogen generated by applying the first decompression current and the second decompression current to the fuel cell.

5. The method of controlling a hydrogen/oxygen producing system according to claim 4, wherein the controller is controlled to determine an operation time of the fuel cell on the basis of a time length in which the first decompression current and the second decompression current are applied.

6. A hydrogen/oxygen producing system comprising:
   a water electrolysis apparatus configured to electrolyze liquid water by applying a current to an anode and a cathode provided on both surfaces of an electrolyte membrane, generate hydrogen at the cathode, and generate oxygen at the anode with a higher pressure than that of the hydrogen;
   a supply part configured to supply the liquid water to the water electrolysis apparatus;
   an electrochemical hydrogen pressurizing apparatus configured to pressurize the hydrogen at a downstream of the water electrolysis apparatus by applying a current to a pressurizing part anode and a pressurizing part cathode provided on both surfaces of an electrolyte membrane; and
   a controller configured to control a current applied to the water electrolysis apparatus and a current applied to the electrochemical hydrogen pressurizing apparatus, and, when the system is stopped, configured to perform a first decompression processing such that a decompression speed of the pressurizing part cathode of the electrochemical hydrogen pressurizing apparatus does not exceed a basic decompression speed and to perform a second decompression processing such that a decompression speed of the anode of the water electrolysis apparatus does not exceed the decompression speed of the pressurizing part cathode of the electrochemical hydrogen pressurizing apparatus.

7. The hydrogen/oxygen producing system according to claim 6, wherein the water electrolysis apparatus is a solid polymer type using an anion exchange membrane,
   the electrochemical hydrogen pressurizing apparatus is a solid polymer type using a proton exchange membrane,
   a fuel cell configured to generate electric power using the oxygen and the hydrogen is provided, and the electric power generated by the fuel cell is used for at least one of the water electrolysis apparatus and the electrochemical hydrogen pressurizing apparatus.

\* \* \* \* \*